United States Patent
Nefcy et al.

(10) Patent No.: US 8,808,138 B2
(45) Date of Patent: Aug. 19, 2014

(54) VEHICLE AND METHOD FOR CONTROLLING POWERTRAIN COMPONENTS OF A VEHICLE

(75) Inventors: Bernard D. Nefcy, Novi, MI (US); Daniel Scott Colvin, Farmington Hills, MI (US); Marvin Paul Kraska, Dearborn, MI (US); Michael John Encelewski, Northville, MI (US); Hong Jiang, Birmingham, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 13/465,754

(22) Filed: May 7, 2012

(65) Prior Publication Data

US 2013/0296114 A1    Nov. 7, 2013

(51) Int. Cl.
*B60W 10/02* (2006.01)
*B60W 10/08* (2006.01)

(52) U.S. Cl.
USPC ............................... 477/5; 903/912; 903/914

(58) Field of Classification Search
USPC ............. 477/5, 8, 14, 20, 108, 111, 115, 166, 477/174–176, 180; 903/903, 910, 912, 914, 903/930, 946; 180/65.21, 245, 275, 285
See application file for complete search history.

(56) References Cited

U.S. PATENT DOCUMENTS

| | | | |
|---|---|---|---|
| 7,044,888 B2 | 5/2006 | Lee et al. | |
| 7,686,112 B2 | 3/2010 | Shiiba | |
| 7,691,027 B2 | 4/2010 | Soliman et al. | |
| 7,896,114 B2 | 3/2011 | Colvin et al. | |
| 7,938,209 B2 * | 5/2011 | Dilzer et al. | 180/65.28 |
| 7,975,791 B2 * | 7/2011 | Nozaki et al. | 180/65.6 |
| 8,043,194 B2 | 10/2011 | Soliman et al. | |
| 2005/0121239 A1 * | 6/2005 | Tsuneyoshi et al. | 180/65.2 |
| 2010/0197450 A1 * | 8/2010 | Mittelberger et al. | 477/5 |
| 2011/0118915 A1 | 5/2011 | Ortmann et al. | |
| 2013/0296113 A1 * | 11/2013 | Nefcy et al. | 477/5 |

* cited by examiner

*Primary Examiner* — Justin Holmes
(74) *Attorney, Agent, or Firm* — David B. Kelley; Brooks Kushman P.C.

(57) ABSTRACT

A vehicle includes an engine, a traction motor, and a torque converter that is driven by the traction motor. A clutch arrangement mechanically couples an output of the torque converter to transmission gearing. A controller is provided in the vehicle that is configured to command an increase in slip, or decrease in clutch pressure, in the clutch arrangement in response to an increase in speed of the traction motor. The commanding of an increase in slip enables a product of the torque ratio of the torque converter and an input torque to the torque converter to remain generally constant during the increase in speed of the traction motor.

14 Claims, 2 Drawing Sheets

VEHICLE AND METHOD FOR CONTROLLING POWERTRAIN COMPONENTS OF A VEHICLE

TECHNICAL FIELD

The present disclosure relates to the control of a powertrain in a hybrid electric vehicle.

BACKGROUND

Hybrid electric vehicles (HEV's) include an internal combustion engine and a traction motor to provide power to propel the vehicle. One method of increasing fuel economy in the HEV is to shut down the engine when the vehicle is motionless, idling or creeping, due to the low power demand. However, if the driver power demand is high enough such that the traction motor cannot provide enough power to meet the demand, or if the traction battery state of charge (SOC) is below a certain threshold, the engine must be activated or remain active to supplement the power deficiencies of the traction motor and/or battery. A further decrease in the SOC, for example, can cause a need for an increase in engine power output even while the engine is already active.

SUMMARY

According to one aspect of the present disclosure, a vehicle includes a torque converter, an electric machine configured to drive the torque converter, and transmission gearing. A clutch arrangement is provided that is configured to mechanically couple an output of the torque converter to the transmission gearing. At least one controller is configured to command an increase in slip of the clutch arrangement in response to an increase in speed of the electric machine. A product of a torque ratio of the torque converter and an input torque to the torque converter remains generally constant during the increase in speed of the electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
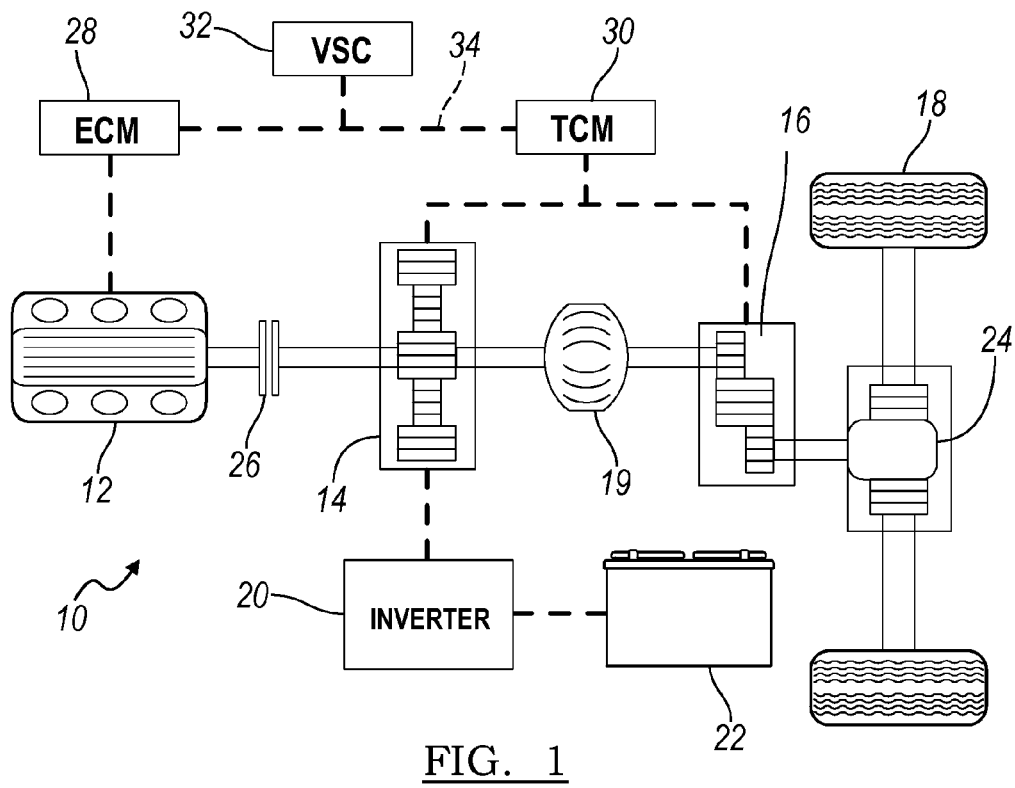
FIG. 1 is a schematic diagram of a vehicle.

Referring to FIG. 1, a schematic diagram of a vehicle 10 is illustrated according to one embodiment of the present disclosure. The vehicle 10 is an HEV. The powertrain or driveline of the vehicle 10 includes an engine 12, an electric machine or motor/generator (M/G) 14, and a transmission 16 disposed between the M/G 14 and wheels 18. A torque converter 19 is provided between the M/G 14 and the transmission 16. The torque converter 19 transfers rotating power from the M/G 14 to the transmission 16. It should be understood that instead of a torque converter 19, one or more clutches can be provided to selectively transfer torque from the M/G 14 to the transmission 16. Other configurations are also possible.

The M/G 14 can operate as a generator by receiving torque from the engine 12 and supplying AC voltage to an inverter 20, whereby the inverter converts the voltage into DC voltage to charge a traction battery, or battery 22. The M/G 14 can operate as a generator by utilizing regenerative braking to convert the braking energy of the vehicle 10 into electric energy to be stored in the battery 22. Alternatively, the M/G 14 can operate as a motor. The M/G 14 receives power from the inverter 20 and battery 22 and provides torque through the torque converter 19 (or clutch), through the transmission 16 and ultimately to the wheels 18. A differential 24 can be provided to distribute torque from the output of the transmission 16 to the wheels 18.

A first clutch, or disconnect clutch 26 is located between the engine 12 and the M/G 14. The disconnect clutch 26 can be fully open, partially engaged, or fully engaged (locked). In order to start the engine 12, the M/G 14 rotates the engine 12 when the disconnect clutch 26 is at least partially engaged. Once the engine 12 is rotated by the M/G 14 to a certain speed (e.g., ~100-200 rpm), fuel entry and ignition can commence. This enables the engine 12 to "start" and to provide torque back to the M/G 14, whereby the M/G 14 can charge the battery 22 and/or power the wheels 18 to propel the vehicle 10. Alternatively, a separate engine starter motor (not shown) can be provided.

The vehicle 10 also includes a control system, shown in the embodiment of FIG. 1 as three separate controllers: an engine control module (ECM) 28, a transmission control module (TCM) 30, and a vehicle system controller (VSC) 32. The ECM 28 is directly connected to the engine 12, and the TCM 30 can be connected to the M/G 14 and the transmission 16. The three controllers 28, 30, 32 are connected to each other via a controller area network (CAN) 34. The VSC 32 commands the ECM 28 to control the engine 12 and the TCM 30 to control the M/G 14 and the transmission 16. Although the control system of the vehicle 10 includes three separate controllers, such a control system can include more or less than three controllers, as desired. For example, a separate motor control module can be directly connected to the M/G 14 and to the other controllers in the CAN 34.

Figure 2:
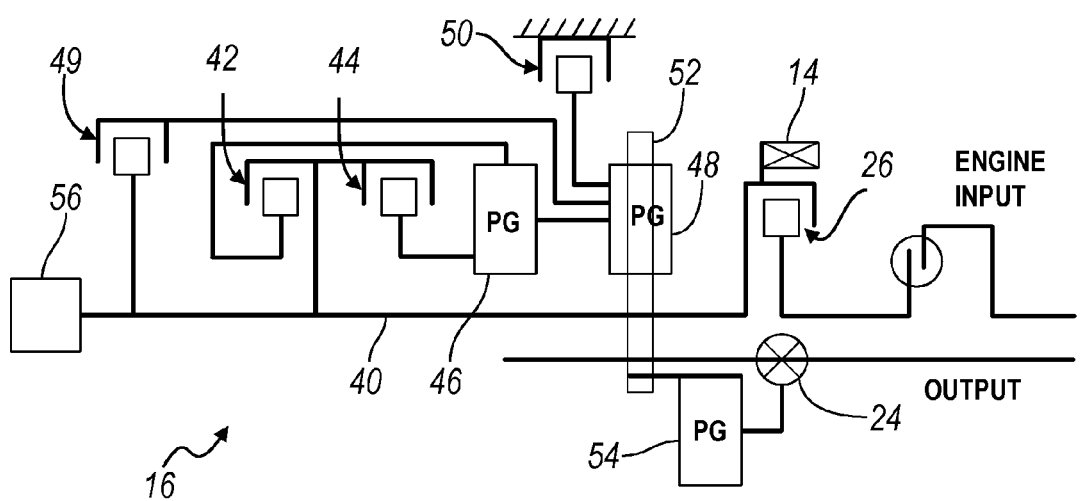
FIG. 2 is a schematic diagram of a transmission in combination with other elements shown in FIG. 1.

Referring to FIG. 2, the transmission 16 is shown in detail. It should be understood that FIG. 2 merely exemplifies one configuration of a transmission 16. In a vehicle 10 utilizing the exemplified configuration of FIG. 2, a torque converter may not be needed in the vehicle, due to the multiple clutches and planetary gearsets within the transmission. It should therefore be understood that a simplified transmission 16 can be utilized in combination with a torque converter, in which fewer clutches and planetary gearsets are needed within the transmission 16. Several other embodiments are contemplated with various configurations of clutches and/or planetary gearsets, with or without the use of a torque converter, as known in the art.

The transmission 16 of FIG. 2 includes an input shaft 40 that receives torque from the engine 12 and the M/G 14 either separately or in combination. The input shaft 40 is operatively connected to a second clutch 42 and a third clutch 44. A portion of each of the second clutch 42 and third clutch 44 is connected to a first planetary gearset (PG) 46, which is connected to a second planetary gearset (PG) 48. A reverse clutch, or fourth clutch 49 and a low-and-reverse brake, or fifth clutch 50 can also be connected to the PG 48. The second PG 48 drives a belt or chain 52 to transmit power to a third planetary gear set (PG) 54. Each of the planetary gear sets 46, 48, 54 can include a sun gear, a ring gear, and a planetary carrier to provide various gear ratios in the transmission 16. The third PG 52 provides a final gear ratio to transmit torque from the transmission 16 to the differential 24.

A pump 56 provides pressure to each of the clutches to engage/disengage each clutch as dictated by the TCM 30. It should be understood that one or more of the clutches 42, 44, 49, 50 can be controlled to be engaged (locked), partially engaged, or fully disengaged, similar to the operation of the disconnect clutch 26. For example, when the second clutch 42 and/or the third clutch 44 are disengaged, the transmission 16 can be isolated from the M/G 14 such that no torque is transmitted through the transmission 16 and to the wheels 18. It should also be understood that while clutches 42, 44 are illustrated as being a part of the transmission 16, one or more clutches can be separately utilized between the M/G 14 and the transmission 16 instead of being integral with the transmission 16.

Referring to FIG. 1-2, when power demands are below a threshold, the engine 12 can be disabled to save fuel. While the engine 12 is disabled, the M/G 14 can be operated as a motor by receiving stored energy from the battery 22 and propelling the vehicle 10. The M/G 14 and the battery 22 fulfill all of the energy demands of the vehicle 10, until the engine 12 is needed to start and supplement the power of the M/G 14 to fulfill power demands, as previously described.

Under certain operating conditions, the vehicle's power demands are relatively low and thus power demands from the engine 12 are low and may not be needed to fulfill the vehicle's power demands. One such operating condition is when the vehicle 10 is stopped with the user depressing the brake pedal. Another such operating condition is when the vehicle 10 is idling, i.e., the vehicle 10 is at rest with the accelerator pedal not depressed. When idling, if, for example, the accessories in the vehicle (e.g., air conditioning, radio, lights, etc.) are demanding power below a certain threshold while the vehicle 10 is idling, the power demands may not be high such that the engine 12 can be disabled (if already on) or continued to be disabled (if already disabled). The battery 22 and an accessory battery (not shown) thus fulfill the power demands of the vehicle during idle. Another such operating condition is when the vehicle 10 is "creeping". During creeping, the M/G 14 can output a small amount of torque to the wheels so that when a user releases the brake pedal the vehicle 10 moves slightly forward or holds steady on an incline.

Stopped, idling and creeping are three examples of operating condition of the vehicle 10 in which the engine 12 may not be needed to power the wheels 18 and thus can be disabled. The engine 12 is needed when the user of the vehicle 10 depresses the accelerator pedal and the M/G 14 cannot alone supply the desired torque. However, in certain situations the engine 12 may be needed to supplement the power demands of the vehicle 10 even while the vehicle 10 remains stopped, idling or creeping. For example, if the SOC of the battery 22 falls below a predetermined threshold, the engine 12 is needed to fulfill the power demands of the vehicle 10. The VSC 32 sends a request to activate or "pull-up" the engine 12. In order to pull-up the engine 12, the M/G 14 operates to both provide the desired amount of torque to the transmission 16 and to spin the rod of the engine 12. During engine pull-up, the disconnect clutch 26 is at least partially engaged, such that the torque of the M/G 14 can be utilized to bring the engine 12 up towards the speed of the M/G 14. Once the engine 12 has reached a predetermined speed, ignition begins and the engine 12 works to provide torque. The additional energy from the engine 12 can then be utilized in charging the battery 22.

If the engine 12 is already activated while the vehicle 10 is stopped, idling or creeping, a low SOC in the battery 22 can require an increase in speed and/or torque from the engine 12. The increase in speed and/or torque from the engine 12, while the disconnect clutch 26 is at least partially engaged, increases the rotational speed of the M/G 14 such that the battery 22 is charged at a higher rate. While further description is provided below, it should be understood that reference to an increase in speed of the M/G 14 can refer to the situations in which the engine 12 provides a boost of speed and/or torque as a result of either being pulled-up, or, if already pulled-up, as a result of a command of a boost of torque from the VSC 32 to more efficiently charge the battery 22.

When the engine 12 is being pulled-up by the M/G 14, a sudden and sharp boost in torque is output by the engine 12 immediately following ignition. Similarly, a torque boost in the engine 12 can also be output if the engine 12 is commanded to increase its torque from the VSC 32 after already being pulled-up. This sharp torque boost is translated into an increased speed in the M/G 14 if the disconnect clutch 26 is locked or at least partially engaged. The increase in speed in the M/G 14 can result in an increase in torque to the input of the torque converter 19. The immediate imbalance of torque to the input of the torque converter 19 as compared to the output of the torque converter 19 drivably translates into more torque being sent to the transmission. If the transmission operates normally, occupants of the vehicle 10 can thus be able to feel this additional torque boost at the wheels 18 after being sent from the engine, through the M/G 14, the torque converter 19, and the transmission 16.

To combat this potentially undesired torque boost while the engine 12 is increasing in torque, the VSC 32 (and/or TCM 30) commands at least one of the second and third clutches 42, 44 to slip during the increase in speed of the M/G 14. The slip of the clutches 42, 44 provides a generally constant speed ratio across the torque converter 19 due to the transmission resisting less of the torque from the torque converter 19. As the speed of the M/G 14 increases, possibly due to the increase in torque from the engine 12, the slipping of a clutch in the transmission 16 assures that a product of the torque ratio of the torque converter 19 and an input torque to the torque converter 19 remains generally constant. This also allows the battery 22 to charge more efficiently without a torque boost felt at the wheels 18, as an increase in torque is available upstream of the transmission 16 and converted by the M/G 14 to charge the battery 22. It should again be understood that while references to slipping the clutches 42, 44 is provided, it is contemplated that slipping of other clutches inside the transmission 16 can be utilized. Furthermore, slipping of the clutches 42, 44 can refer to slipping any clutch disposed outside the transmission 16 and downstream of the M/G 14, and can be a clutch integral with the torque converter 19. A simple clutch can also be provided in place of the torque converter 19, and thus the VSC 32 can command the simple clutch to slip in response to the speed of the M/G 14.

In any of the above referenced embodiments, the slip of the clutches 42, 44 is controlled by the VSC 32 in response to the speed of the M/G 14. For example, in one embodiment, the speed of the M/G 14 is determined by the VSC 32, and the pressure of the clutches 42, 44 is commanded to decrease as the speed of the M/G 14 increases. The slipping of one of the clutches 42, 44 enables the ratio of the input speed to output speed on either side of the torque converter 19 to remain generally constant. The torque converter 19 transmits and multiples torque from the output of the M/G 14 and into the input of the transmission 16. Therefore, the slipping of the clutches 42, 44 reduces the resistance forces applied on the output of the torque converter 19 from the transmission 16. This enables a generally constant speed ratio between the input and output of the torque converter 19. The generally constant speed ratio inhibits torque boosts from the engine 12 from translating into increases in torque through the transmission 16 and to the wheels 18.

References to a generally constant speed ratio across the torque converter 19 can also refer to a product of the torque ratio of the torque converter 19 and an input torque to the torque converter remaining generally constant. Under certain conditions, this product of torque ratio and input torque is generally constant. For example, while the vehicle is creeping constantly across a level flat surface, the product can be generally constant, or at least within a relatively small predetermined value or limit. However, under other conditions, the product of the torque ratio and the input torque can increase or decrease within a larger predetermined value or limit. For example, if the vehicle is transitioning between idling and creeping, the desired torque to the wheels can increase or decrease accordingly. It should therefore be understood that, based on vehicle conditions, the term "generally constant" can also circumstances in which the product of the torque ratio and the input torque to the torque converter 19 is not constant per se, but is within a predetermined limit to allow for the desired torque to be transferred to the wheels 18, for example.

Figure 3:
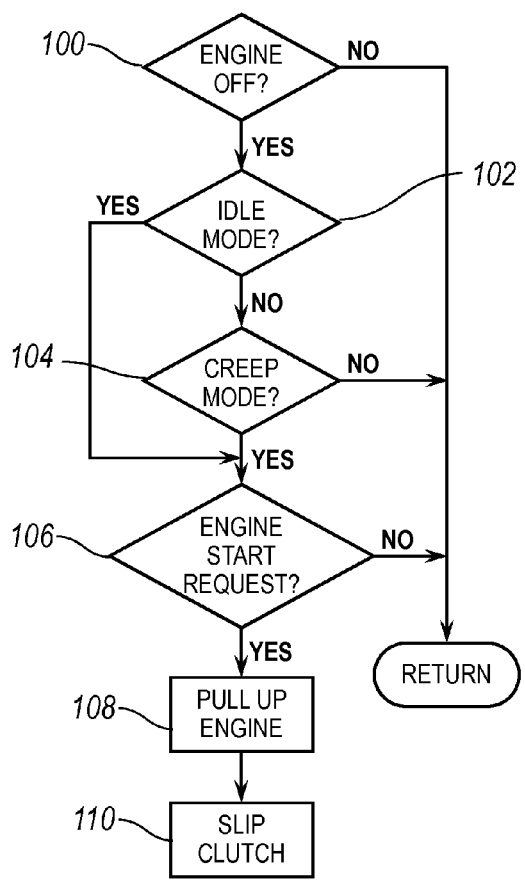
FIG. 3 is a flow chart illustrating an algorithm for controlling a clutch during engine pull-up.

Referring to FIG. 3, an algorithm for controlling a clutch during engine pull-up is illustrated according to the present disclosure. Reference is also made to structural components from FIGS. 1-2 while a description of the algorithm is provided. The algorithm is utilized by the VSC 32, for example. At operation 100, the VSC 32 determines whether the engine 12 is off. If it is determined that the engine 12 is off, a decision is made at operation 102 as to whether the vehicle 10 is idling (e.g., the vehicle 10 is at rest with no accelerator demands). If the vehicle 10 is not idling, a decision is made at operation 104 as to whether the vehicle 10 is creeping (e.g., a small amount of torque is being provided to the wheels 18). In one embodiment, a further determination can be made as to whether the vehicle is stopped while the brake pedal is depressed.

If the vehicle is stopped, idling or creeping, the VSC 32 determines whether or not an engine start request must be made at operation 106. An engine start request is made based upon a torque increase in the engine being needed to supplement high power demands or to charge the battery 22, as previously described. If an engine start request is determined to be made, the VSC 32 commands the engine to pull-up at operation 108. Once the engine pulls-up, an initial torque boost from the engine 12 can cause the speed of the M/G 14 to increase. At operation 110, the VSC 32 responds to any motor speed increases by commanding at least one of the clutches 42, 44 to slip. The slip in the clutches 42, 44 at least partially isolates the torque converter 19 from the transmission 16 such that the torque disturbances in the engine pull-up are minimized or eliminated.

Figure 4:
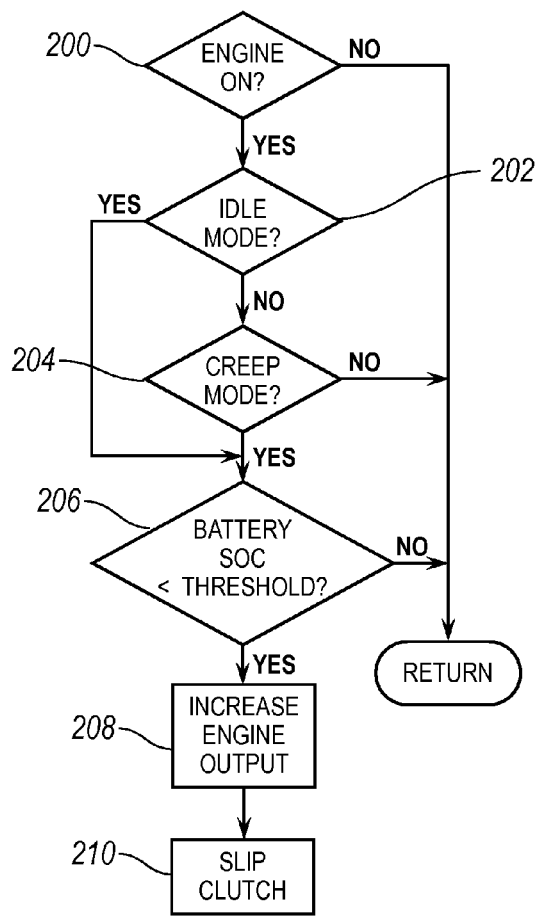
FIG. 4 is a flow chart illustrating an algorithm for controlling a clutch during engine torque increase.

Referring to FIG. 4, an algorithm for controlling a clutch during increases in engine torque while the engine is on is illustrated. Reference is again made to the structural components from FIG. 1-2. At operation 200, the VSC 32 determines whether the engine is on. If the engine is on, the VSC 32 determines if the vehicle 10 is idling at operation 202. If the vehicle not idling, a determination is made as to whether the vehicle is creeping at operation 204. If the vehicle is idling, the method continues to operation 206. At operation 206, the VSC 32 determines whether or not the SOC of the battery 22 is below a threshold and therefore needs to be charged additionally and at a higher rate than the current operating conditions would allow. The threshold can be, for example, 20% of full capacity. At operation 208, the VSC 32 commands the engine 12 to increase its power output to charge at a higher rate. This results in additional speed in the M/G 14 so that the battery 22 can further be charged at the higher rate. At operation 210, the VSC 32 responds to any speed increases in the M/G 14 by commanding at least one of the clutches 42, 44 to slip. The slip at least partially isolates any additional torque in the output of the torque converter 19 from translating into additional torque at the wheels 18 through the transmission 16.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a torque converter;
an electric machine configured to drive the torque converter;
transmission gearing;
a clutch arrangement configured to mechanically couple an output of the torque converter to the transmission gearing; and
at least one controller configured to, based on the vehicle being stopped, idle, or creeping, command an increase in slip of the clutch arrangement in response to an increase in speed of the electric machine such that a product of a torque ratio of the torque converter and an input torque to the torque converter remains generally constant during the increase in speed.

2. The vehicle of claim 1, wherein a pressure of the clutch arrangement is altered in response to the command based on an input speed and output speed of the torque converter.

3. The vehicle of claim 1 further comprising an engine coupled to the electric machine, wherein the at least one controller is further configured to command an increase in speed of the engine to increase the speed of the electric machine.

4. The vehicle of claim 3 further comprising a traction battery electrically connected to the electric machine, wherein the at least one controller is further configured to command the increase in speed of the engine based upon a state of charge of the traction battery.

5. The vehicle of claim 3 further comprising a traction battery electrically connected to the electric machine, wherein the at least one controller is further configured to command the increase in speed of the engine in response to a state of charge of the traction battery being less than a predetermined threshold.

6. A vehicle comprising:
a torque converter;
an electric machine configured to drive the torque converter;
transmission gearing;
a clutch arrangement configured to mechanically couple an output of the torque converter to the transmission gearing; and
at least one controller configured to, based on the vehicle being stopped, idle, or creeping, command a change in a pressure of the clutch arrangement based on an input speed and output speed of the torque converter such that a product of a torque ratio of the torque converter and an input torque to the torque converter remains generally constant during an increase in speed of the electric machine.

7. The vehicle of claim 6, wherein the change in pressure of the clutch arrangement causes a slip in the clutch arrangement.

8. The vehicle of claim 6 further comprising an engine coupled to the electric machine, wherein the at least one controller is further configured to command a change in speed of the engine to change the speed of the electric machine.

9. The vehicle of claim 8 further comprising a traction battery electrically connected to the electric machine, wherein the at least one controller is further configured to command the change in speed of the engine based upon a state of charge of the traction battery.

10. The vehicle of claim 8 further comprising a traction battery electrically connected to the electric machine, wherein the at least one controller is further configured to command the change in speed of the engine in response to a state of charge of the traction battery being less than a predetermined threshold.

11. A method of controlling a vehicle driveline comprising:
based on the vehicle being stopped, idle, or creeping, increasing a slip of a clutch arrangement configured to mechanically couple an electric machine to transmission gearing in response to an increase in speed of the electric machine such that a product of a torque ratio of and an input torque to a torque converter driven by the electric machine remains generally constant during the increase in speed.

12. The method of claim 11 further comprising increasing a speed of an engine based upon a state of charge of a traction battery electrically connected to the electric machine.

13. The method of claim 11 further comprising increasing a speed of an engine in response to a state of charge of a traction battery electrically connected to the electric machine being less than a predetermined threshold.

14. The method of claim 11, wherein the increase in slip is caused by reducing a pressure of the clutch arrangement.

* * * * *